3,613,168
APPARATUS FOR MANUFACTURE OF CORED RUBBER ROLLS HAVING A SLEEVE THEREON
Le Roy R. Rowland, c/o Mrs. Gertrude Rowland, 2014 Frampton St., Charleston, S.C. 29407, and Charles L. Tavelle, 107 Temple Ave., North Charleston, S.C. 29406
Filed July 2, 1969, Ser. No. 9,242
(Filed under Rule 47(a) and 35 U.S.C. 116)
Int. Cl. B29f 1/00
U.S. Cl. 18—30 UM                                    10 Claims

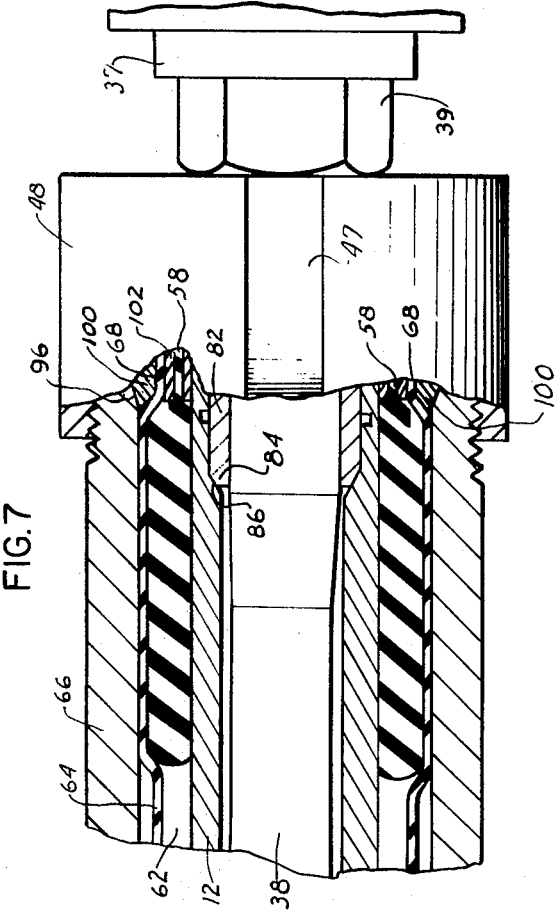
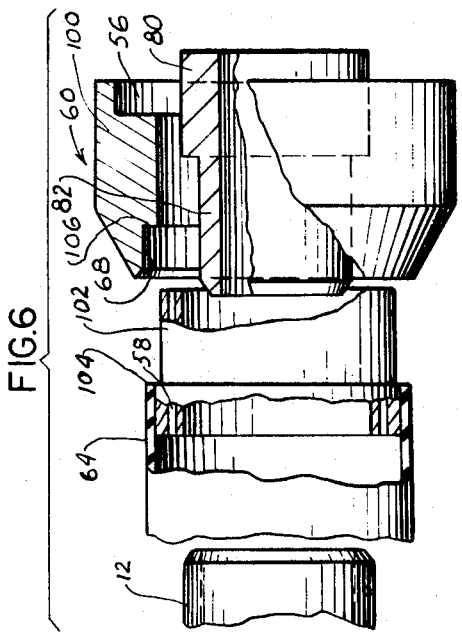
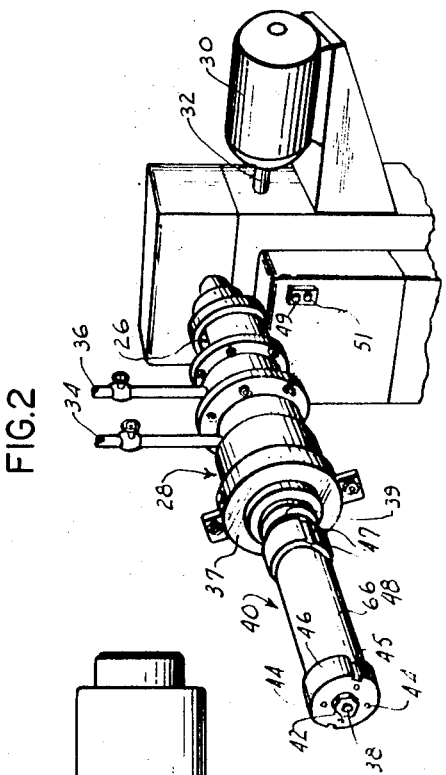
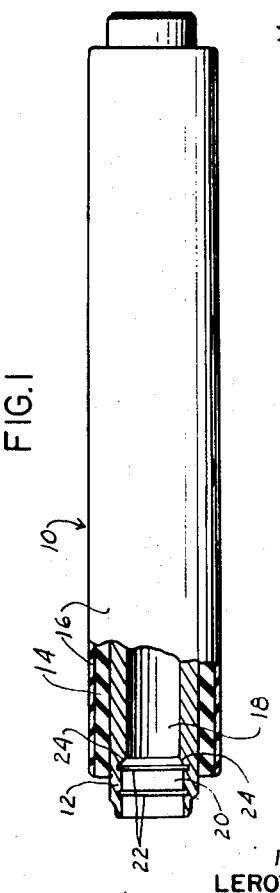
INVENTORS
LEROY R. ROWLAND
CHARLES L. TAVELLE
ATTORNEYS

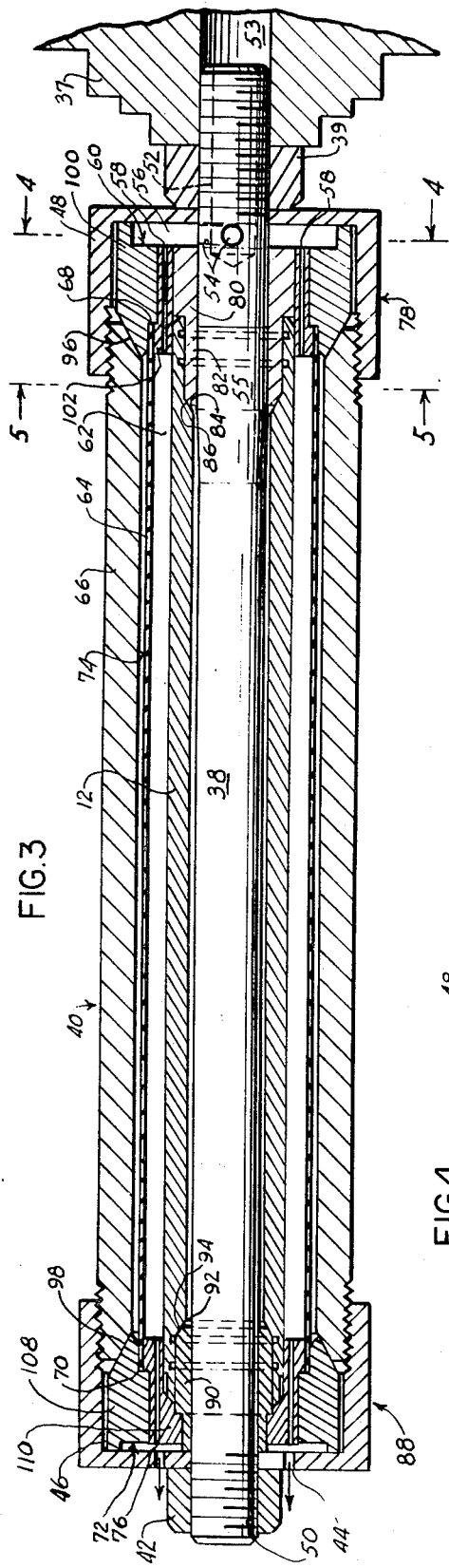
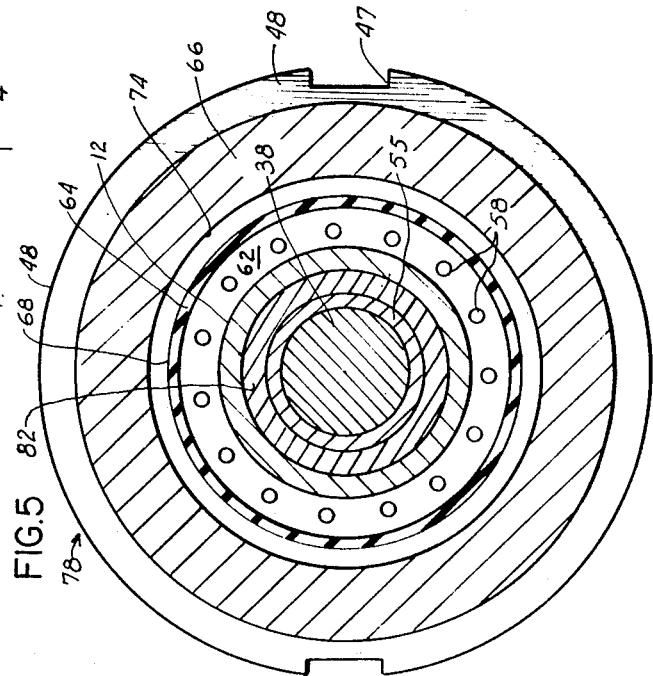
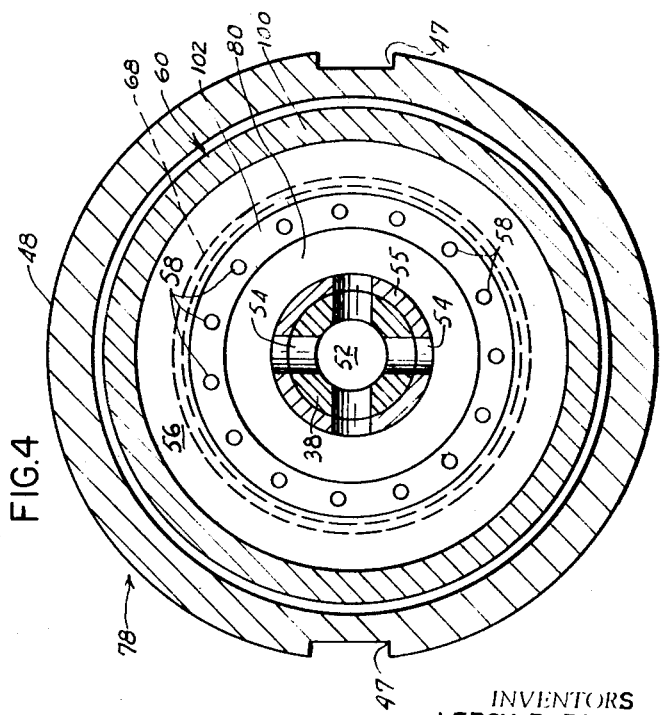
INVENTORS
LEROY R. ROWLAND
CHARLES L. TAVELLE
ATTORNEYS United States Patent Office 3,613,168
Patented Oct. 19, 1971

ABSTRACT OF THE DISCLOSURE

A method and an apparatus for producing a cored rubber roll having a thin flexible sleeve placed thereon. The method is characterized by the simultaneous formation of the rubber roll and the placement of the sleeve thereon. The sleeve is placed in a mold casing concentric with and substantially evenly spaced from a core, and rubber is forced into the space between the core and sleeve. The rubber is under pressure while it is continuously supplied to the area between the core and the sleeve and the pressure of the rubber on the sleeve causes the sleeve to expand against the inside surface of the casing. The rubber is continuously fed into the available area until all of the spacing has been filled, and in this manner the sleeve is integrally bonded to the rubber while the rubber is simultaneously integrally bonded to the core.

---

This invention relates to a method and apparatus for forming cored rubber rolls, and more particularly to a method and apparatus for simultaneously placing a thin sleeve on a rubber roll while forming the rubber roll.

Rubber rolls have found widespread use in a wide variety of applications. Processing rolls used in the textile industry, printing rolls used for press printing, i.e., ink transfer rolls, and fuser rolls used in xerography copiers are all examples of specific applications for rolls of the type herein described. In all of these applications it is highly desirable to provide a jacket or sleeve around the outside surface of the rubber rolls in order to provide a low coefficient of friction so that resistance to the rotation of the roll in an adjacent surface is reduced. For this purpose, the sleeve is provided with a smooth outer surface and in addition, it is generally flexible so that the resilient character of the rubber will not be adversely affected during the operation of the roll. Fluorocarbon materials are quite suitable as a sleeve material, and are therefore often used. More specifically, polytetrafluoroethylene, which is commonly known as Teflon (registered trademark of Du Pont Corporation) and polytrifluorochloroethylene are examples of fluorocarbon sleeves which are frequently used.

Several methods are currently employed to place the sleeve on the rubber roll. One method involves spraying Teflon about the outside surface of the roll to form a thin coating which is then sintered and further processed. The sleeve formed in this manner is usually very thin and consequently has a short operating life. The rolls must therefore be frequently replaced thus causing a loss of equipment operating time. Moreover, the rolls may well be warped or wrinkled at temperatures required for sintering. In another method a relatively thick sleeve is machined to fit the roll, and then placed thereon and secured by some fastening means. While somewhat successful, this method is generally expensive, wasteful and often causes other difficulties because the fasteners become loose during operation. Still another method which has more recently been developed is the use of a heat shrinkable sleeve which is first expanded and then placed around a roll and heated so that it shrinks about the outside surface of the roll. An adhesive material is applied to the roll surface prior to the heat shrinking operation to ensure a proper bond between the roll surface and sleeve. Such a method is somewhat disadvantageous to employ because of the large number of processing steps required. The application of an adhesive is time consuming and expensive since it requires processing time for applying and curing the adhesive, and since the adhesive itself is quite expensive. Furthermore, a high number of unusable products are produced in this method due to the distorted or wrinkled sleeve surface after shrinking is effected.

It is therefore the primary object of the present invention to provide a method and apparatus for reducing the time and the expense involve in placing a sleeve of the character described on a rubber roll and for producing a high quality product with a low percentage of rejects.

Broadly, the method of producing a cored rubber roll while simultaneously placing a thin flexible sleeve thereon comprises placing the sleeve into a mold casing and around a core member positioned in the casing, supporting the sleeve so as to provide a space between the core member and the sleeve, feeding rubber into the space between the core member and the sleeve, applying the pressure to the rubber while feeding it into the space to thereby cause the rubber to accumulate and expand the sleeve against the inside surface of the mold casing, continuing to feed the rubber into the spacing until all of the available space is filled between the core and the sleeve, thereby to fully expand the sleeve against the inside casing along substantially the entire length of the sleeve. In the preferred embodiment of the invention, the rubber is passed into the space from a number of directions so as to expand the sleeve substantially simultaneously in all directions. For this purpose the mold assembly is provided with end sections which include a plurality of small circular holes through which the rubber is passed in a plurality of streams. The holes are smaller than the space into which the rubber passes and as a result the pressurized rubber accumulates in the space near the holes and begins to expand the sleeve. After the sleeve in a particular area is expanded by the rubber against the inside mold casing, the continued passage of rubber into the same area causes the rubber to slowly travel along the axial length of the space between sleve and core member with the consequent further periodic accumulation of the rubber and expansion of the sleeve. The process is continued until the rubber fills substantially all of the available space between the core and the sleeve. In this manner not only is the rubber formeed about the core with precise dimensions but the sleeve is also simultaneously bonded to the rubber as it is pressed by the rubber under great pressure against the inside surface of the casing. After the rubber has filled the available space the entire mold is removed and may then be placed in an oven and processed to a temperature at which the rubber is vulcanized. Thereafter, the assembly of core, rubber roll and sleeve is withdrawn from the mold and may be slowly heated to approximately 400° F. for the purposes of driving off excess gases that may have been trapped within the rubber, if desired.

The apparatus of the invention is characterized by a means for centering the sleeve, the core member and the mold casing so that the roll product is manufactured to a close tolerance. In the preferred embodiment, the means for centering the sleeve is a circular groove placed in the removable end section at each end of the mold. The grooves on each end section are in axial registration with each other when the end sections are secured to the casing. The mean diameter of each groove is greater than the diameter of the core and less than the inside diameter of the casing. The use of such grooves enables an even spacing of the sleeve from the core over the entire axial length of the sleeve to be effected and this is useful in enabling the sleeve to be evenly expanded as the process is carried out. The apparatus is further characterized by the use of means for centering the core which includes a piston member positioned at the center area of each end section. The piston members project toward the core when the end sections are positioned on the casing. The outside diameter of the projecting part of each piston member is dimensioned so that it is adapted to fit within the hollow core. The piston member at the inlet end section is preferably slidably mounted so that its position may be adjusted to ensure contact with the inside edge of the core. To ensure the proper centering of the core, the end of the projecting part of each piston member is provided with a taper which matches a taper provided on the inside edge of the core.

To the accomplishment of the above, and to such other objects as may hereinafter appear, the present invention relates to the method and apparatus for producing cored rubber rolls as defined in the appended claims, and as described in this specification, taken together with the accompanying drawings in which:

FIG. 1 is an illustration partly in section of one example of a cored rubber roll manufactured by the process of the invention;

FIG. 2 is a perspective view showing an apparatus which may be employed to carry out the process of the invention;

FIG. 3 is a transverse section taken along the longitudinal axis of the mold portion of the apparatus illustrated in FIG. 2;

FIG. 4 is an enlarged transverse section taken along the lines 4—4 of FIG. 3;

FIG. 5 is an enlarged transverse section taken along the lines 5—5 of FIG. 3;

FIG. 6 is a fragmentary plan view partially in section of a plurality of components at the inlet end of the mold assembly of FIG. 3; and FIG. 7 is a fragmentary sectional view of the inlet end of the mold illustrated in FIG. 3 with the rubber shown expanding the sleeve.

Referring to the drawing and specifically to FIG. 1, there is shown a roll 10 comprising a metal core 12 and a rubber body 14. A thin flexible sleeve 16 is placed around the rubber 14 and completely encloses it except for the ends of the roll. The core 12 is hollow as indicated at 18, and the ends are counterbored to a larger diameter as shown at 20 for the purposes of receiving anti-friction bearings such as ball or roller bearings. The bearings may be held in position axially by means of snap rings which may be received in the annular grooves 22. The tapers 24 which are formed at the counterbored opening 20 are utilized in the apparatus of the present invention for the purposes of centering the core in the mold assembly as further explained hereinafter. The sleeve 16 as before indicated is preferably composed of a fluorocarbon material and will hereafter be referred to as Teflon but may be composed of any equivalent material such as an expandable plastic. The rubber 14 may be composed of an elastomer including rubber compounds and many synthetics such as neoprene, silicone and the like. The preferred material for use in the roll is silicon rubber. A silicone resin adhesive may be placed between the rubber 14 and the core 12 in order to ensure a proper bond between these two members, but it is preferably not included between the rubber 14 and the sleeve 16 since it is not necessary for a proper bond between these components when the process of the invention is carried out.

The roll 10 illustrated in FIG. 1 is produced in an apparatus such as that shown in the perspective illustration of FIG. 2. As there shown the rubber is passed into the hopper opening 26 of a screw type extruder generally designated 28. This extruder may be of any of the well known conventional types and is driven by an electric motor 30 through shaft 32. The extruder chamber is provided with an enclosure and may be heated or cooled as required by means of a heated or cooled fluid which is passed to the interior of the enclosure through pipes 34 and 36. A spindle 38, best shown in FIG. 3, is integrally attached to the discharge end of the extruder 28 by means of internally threaded adapter 37 and lock nut 39. The spindle serves to removably mount mold assembly 40 in position adjacent the extruder 28. As illustrated in FIGS. 2 and 3 the mold 40 is mounted over the spindle 38 and is held in place by a holding nut 42. A plurality of holes 44 are positioned at one end of the mold assembly 40 in end cap 46 and indicate to the operator when the mold 40 is filled with rubber, since when it is filled the rubber passes through the holes 44. When this occurs the mold assembly 40 is removed from the extruder 28 and is replaced by another mold assembly. A second end cap 48 is positioned opposite end cap 46 on mold 40 and each cap is provided with slots 45 and 47 to receive a spanner wrench for tightening the same when assembling the mold, and for removing the same when opening the mold to withdraw the roll therefrom. The extruder is operated by "start" and "stop" means shown as buttons 49 and 51.

FIG. 3 illustrates the various components which are included in the mold assembly 40. As there illustrated the spindle 38 is shown passing through the core 12 and being held in position at the end of the mold by the holding nut 42. The spindle 38 is threaded at 50 to receive the holding nut. At the other end of the assembly, the spindle is provided with a counterbore 52 into which the rubber from the extruder 28 passes as it is discharged from the extruder through channel 53. A plurality of radial holes 54 are positioned about the spindle 38 and serve to assist the passage of the rubber from the counterbore 52 into the entrance opening 56. The radial holes 54 are also shown in FIG. 4, there being four such holes in the present case. Since the extruder 28 and the spindle 38 are rotating during the operation of the ssytem, the rubber is passed from the counterbore area of the spindle into the entrance opening 56 at a high pressure. The rubber then passes through a plurality of small holes 58 which are positioned in the end part 60 into space 62. Since the holes 58 are small in diameter, the rubber passes into the space 62 under very high pressure. A thin flexible sleeve 64 is mounted within the mold assembly between the casing 66 and the core 12. The sleeve 64 is held at one end in a groove 68 which is formed in the end part 60, and is similarly held at the other end in the groove 70 which is formed in the end part 72. The grooves 68 and 70 are substantially axially aligned so as to provide a substantially equal spacing between the sleeve 64 and the core 12. As the rubber passes into the space 62 from the small holes 58 it accumulates within the space 62 near the holes. The accumulation continues until the sleeve 64 is expanded against the inside surface 74 of the casing 66. Due to the pressure under which the rubber is continuously passed into the space 62, the accumulated rubber is caused to move along the surface of the core member 12, and while so moving, to continue to drive the sleeve 64 against the inside surface 74 of the casing 66. This operation is best illustrated in FIG. 7, where the rubber is shown after it has partially traversed the path along the space 62. Rubber is continuously passed into the space 62 through the holes 58 until all of the space 62 is filled with the rubber. In this manner the sleeve 64 is driven against the inside wall 74 of the casing 66 over its entire length, and due to the extreme force of the rubber, the sleeve adheres to the rubber and is bonded thereto without the use of a bonding material. Detection of the completion of the process occurs when the rubber passes through holes 76 in the end part 72 and through the venting holes 44 as shown in FIG. 3.

At this point the operator stops the extruder, removes the mold assembly 40 from the spindle 38, and replaces it with another mold assembly. Thereafter, the removed mold assembly may be placed into an oven to be heated to a vulcanization temperature of between about 220° F. to about 450° F., if desired. After vulcanization the roll may be cured for several hours at a temperature of about 400° F. to drive off any trapped gases from the rubber.

In order that the manufacture of an accurately dimensioned roll is ensured, the inlet end section 78 in FIG. 3 is characterized by the use of a centering means shown as piston member 80. The piston member 80 includes a projecting part 82 having a tapered edge 84. The piston member 80 is slidably mounted within the hollow area defined by the end part 60 in the end section 78. The piston member 80 is moved by the pressure of the rubber entering the inlet area 56. The taper 84 on the projecting part 82 mates with the inside edge 86 of the core 12. In this manner the core 12 is accurately centered within the end section 78, and such positioning is ensured as different cores are placed in the mold notwithstanding variations in diameter since the position of the piston 80 is adjustable. The exit end section 88 is provided with a similar piston member 90 which is fixed to the end part 72. As illustrated, piston member 90 is also provided with a tapered edge 92 which seats within the inner edge 94 of the core 12 to position the core at the opposite end of the mold assembly. Both tapered edges 84 and 92 are provided with an angle of about 45° in the embodiment illustrated. The piston members 80 and 90 are in substantial axial registration so that proper centering of the core is effected, and each is provided with a hollow central portion so that the spindle 38 can pass therethrough.

Further centering of the casing is achieved at both end assemblies 78 and 88 by means of the tapers 96 and 98 which are placed on the outside edge of the end parts 60 and 72. These tapers, which are approximately 30°, mate with the similar tapers on the inside edge of the casing 66. In this manner, the casing 66 is also centered and aligned with respect to the end sections 78 and 88 and the effect of centering both the core and the casing is to provide a concentric balance between the components in the assembly. The casing 66 is secured in mating position with the end parts 60 and 72 by means of threaded end caps 46 and 48.

The inlet end section assembly 78 is further illustrated in FIGS. 4, 5 and 6. As shown in FIG. 4 the counterbored section 52 of the spindle 38 is in registration with a plurality of radial holes 54 which assist in the dispersion of the rubber as above explained. The spindle may be provided with replaceable bearing metal which is poured into position at 55 to take any wear resulting from the action of the piston member 80. The holes 58 are placed about the periphery of the end part 60 and include in the embodiment here illustrated 15 small holes, preferably of a diameter of about 1/16 of an inch. Best results are achieved when these holes are small in size, the diameter being preferably about one-half of the width of space 62 or less, since a high pressure is ensured. It has been determined that a desirable pressure under which the rubber is forced into the area between the sleeve and the core is at least 1000 p.s.i., but lower pressures are also suitable provided that sufficient pressure on the sleeve is effected. This particular pressure is readily achieved by employing the configuration of holes 58 illustrated in the drawings. Other equipment however may be used to obtain the desired pressure and is considered within the scope of this invention. The holes 58 should not be so small as to prevent the free flow of the rubber or to retard the flow to the extent that long processing times are required. The small diameter of the holes has the additional advantage of retaining the charge of rubber under considerable pressure after the mold has been removed from the extruder and during subsequent curing, if employed. It will be noted that with fifteen such holes the rubber is fed into the space 64 in a plurality of streams thus enabling the expansion of the sleeve to take place in all directions substantially simultaneously. Thus, wrinkles and other defects which would render the sleeve unusable are avoided.

The groove 68 shown in a dotted illustration of FIG. 4, and more clearly illustrated in FIG. 5 is also circular and is substantially concentric with the core 12, and the inside wall 74 of the casing 66. The groove 68 should be of a width which is large enough to receive the sleeve without difficulty but should not be so large as to cause the sleeve to shift position during the process. For a Teflon sleeve of about 0.010 inch to about 0.020 inch, a groove width of about 0.030 inch has been successfully employed to obtain a roll characterized by a smooth, wrinkle-free sleeve. A groove depth of between about 0.2 inch and 0.4 inch is suitable to maintain the sleeve in contact with the end parts 60 and 72 during the expansion of the sleeve.

The space 62 between core 12 and sleeve 64 may be of any suitable width dimension and has generally been about 1/8 inch in practice, as for example, with a core outside diameter of 1¾ inch and a sleeve inside diameter of 2 inches. The space between the inside wall 74 of the casing 66 and the sleeve 64 depends in part upon the ability of the sleeve material to be expanded without rupture, and Teflon has been found to be an acceptable material for expansions of up to thirty percent or more of its diameter. Thus the space between the outside surface of the sleeve and the wall of the casing may be a width of about one-sixth of the diameter of the Teflon sleeve. In addition, the flexible sleeve may be initially placed in the mold in contact with the inside wall of the casing, if desired. In this arrangement the sleeve is still slightly expanded by the force of the rubber and is pressed against the casing by the rubber in the same manner as if it were initially spaced from the casing wall and with the same results.

As above mentioned, the grooves 68 and 70 are accurately positioned and dimensioned, and thus must be carefully placed in the end parts 60 and 72. For this purpose the end parts 60 and 72 are actually composed of two or more preassembled sections. FIG. 6 illustrates the various components which are used in the end section 78 prior to assembly and clearly illustrates the two sections 100 and 102 in end part 60. Section 102 is provided with a shoulder segment 104 which, when in place, abuts against the flanged portion 106 on section 100 to form groove 68. The sleeve 64 is positioned about section 102 with its edge in alignment with shoulder edge 104, since this is the deepest penetration that the sleeve can have in groove 68 when it is formed. The opposite end part 72 (FIG. 3) is also constructed with several sections such as 108 and 110. With these constructions, accurate groove placement in both end sections is ensured.

The parts of the mold are preferably composed of steel and centering pieces 82 and 100 are preferably made of hard tool steel in order to maintain their accuracy. The inside wall 74 of the casing 66 is preferably provided with a smooth finish so that the final roll assembly can be readily removed from the casing after processing.

The Teflon sleeve is etched prior to insertion into the casing so that a strong bond between the sleeve and the rubber is obtained wtihout the necessity of bonding material. The etching may be performed by any of the well known processes currently employed. The sleeve, particularly if it is a fluorocarbon sleeve such as Teflon, may be heat shrinkable so that after expansion by the rubber, it may be heated to provide an even tighter bond with the rubber as it shrinks upon heating around the rubber roll. Generally, heating for this purpose is carried out at a temperature of about 300° F. to about 400° F.

While the apparatus disclosed is directed primarily to a system using a hollow core, it is apparent that the process of the invention is applicable with the use of a solid core. Modifications of the apparatus which are readily apparent to those skilled in the art would have to be undertaken in order to implement the process with a solid core. However, the basic process would remain unaffected and a sleeve would be simultaneously placed around the rubber while the roll is being formed in a single step process.

It will be appreciated from the foregoing description that the present invention provides a method which is simple and inexpensive, and requires very little time to complete. As a result great cost savings are achieved without a sacrifice in the quality of the product produced. No adhesive is required between the sleeve and the rubber core, and this in itself is an innovation which provides a great savings in time and expense. Furthermore, the apparatus of the invention ensures that a closely dimensioned article is formed without the necessity of machining after the process is completed.

It is believed that the construction and method of use of the apparatus of the invention, as well as the advantages thereof, will be apparent from the foregoing detailed description. It will also be apparent that while we have shown and described the improvement in the preferred form, changes may be made without departing from the scope of the invention.

We claim:

1. An apparatus for simultaneously molding a cored rubber roll and a thin flexible sleeve thereon comprising: a mold assembly, said mold assembly comprising a cylindrical casing having at least two removable parts, each part comprising an end section, means to assemble said casing thereby to form a mold cavity having a cylindrical wall and two end walls, a core member positioned within said mold cavity and extending substantially the axial length of said casing between said end sections, means to center said sleeve within said mold cavity and around said core member and spaced from said cylindrical wall, and aperture means in at least one of said end sections through which rubber under high pressure may be continuously forced into the area between said core member and said sleeve in said casing to expand said sleeve and force it against the inside cylindrical wall surface of said casing, thereby to bond said sleeve to said rubber and said rubber to said core member.

2. The apparatus of claim 1, wherein said core member is provided at each end with a recess having a tapered surface therein and further comprising means for centering said core member within said mold cavity comprising a piston member positioned in each end section, each piston member having an extended part projecting toward the interior of said mold cavity, said extended parts being provided with tapered surfaces of a configuration mating with said tapered surfaces in said core recesses, said extended parts being positioned substantially in axial alignment with said core member and being adapted to fit within the recesses in said core member with said tapered surfaces in mating relationship when said casing is assembled to thereby center the core member relative to said casing.

3. The apparatus of claim 2, wherein the inside surface at each end of said core member is tapered to mate with the taper of the extended parts of said piston members.

4. The apparatus of claim 2, wherein one of said piston members is movably mounted within the inlet end section, said piston member being movable toward or away from said core member, whereupon when said end section is connected to said casing said piston member is movably positioned to accurately contact and center said core member.

5. The apparatus of claim 1, wherein said casing comprises an integral elongated cylindrical central housing, and means to removably secure said end sections to said central housing at either end thereof.

6. The apparatus of claim 1, wherein said sleeve centering means comprises a circular groove in each of said end sections, said grooves being in opposing axial registration with each other when said casing is assembled, said grooves being disposed between and spaced from said core and said cylindrical wall of said casing.

7. The apparatus of claim 5, wherein said sleeve centering means comprises a circular groove in each of said end sections, said grooves being in opposing axial registration with each other when said end sections are secured to said central housing, said grooves being disposed between and spaced from said core and said cylindrical wall of said casing.

8. The apparatus of claim 7, wherein said core, said sleeve, and said central housing all have a circular cross section, said grooves in said end sections being circular and having a mean diameter which is greater than the diameter of said core and less than the inside diameter of said central housing.

9. The apparatus of claim 8, wherein each end section is provided with a flared surface extending between said groove and the inner surface of said central housing, said flared surface being inclined in a direction outwardly of said groove toward the other end of said central housing, whereby during molding said sleeve is forced against said flared surfaces thereby to provide the molded roll and sleeve with beveled end surfaces.

10. The apparatus of claim 1, wherein each end section is provided with a flared surface extending between said groove and the inner surface of said central housing, said flared surface being inclined in a direction outwardly of said groove toward the other end of said central housing, whereby during molding said sleeve is forced against said flared surfaces thereby to provide the molded roll and sleeve with beveled end surfaces.

References Cited

UNITED STATES PATENTS

| | | | |
|---|---|---|---|
| 3,380,120 | 4/1968 | Rowland et al. | 18—30 WC |
| 2,845,657 | 8/1958 | Beare | 18—30 UM |
| 2,628,416 | 2/1953 | Sampson | 264—262 |
| 2,864,130 | 12/1958 | Beare | 264—262 |

H. A. KILBY, JR., Primary Examiner

U.S. Cl. X.L.

18—30 WC, 42 D